US011253817B2

United States Patent
Rosenørn et al.

(10) Patent No.: US 11,253,817 B2
(45) Date of Patent: Feb. 22, 2022

(54) METHOD AND SYSTEM FOR TREATING FOUNDRY PROCESS EXHAUST GAS

(71) Applicant: XPURIS GmbH, Düsseldorf (DE)

(72) Inventors: Thomas Rosenørn, Birkenrød (DK); Andrew Butcher, Brønshøj (DK); Kenth Wrist Jensen, Lejre (DK); Michael Gallus, Wuppertal (DE)

(73) Assignee: XPURIS GMBH, Düsseldorf (DE)

( * ) Notice: Subject to any disclaimer, the term of this patent is extended or adjusted under 35 U.S.C. 154(b) by 0 days.

(21) Appl. No.: 16/971,188

(22) PCT Filed: Feb. 28, 2019

(86) PCT No.: PCT/EP2019/054985
§ 371 (c)(1),
(2) Date: Aug. 19, 2020

(87) PCT Pub. No.: WO2019/166550
PCT Pub. Date: Sep. 6, 2019

(65) Prior Publication Data
US 2021/0113963 A1 Apr. 22, 2021

(30) Foreign Application Priority Data
Feb. 28, 2018 (EP) ..................................... 18159228

(51) Int. Cl.
*B01D 53/86* (2006.01)
(52) U.S. Cl.
CPC .. *B01D 53/8668* (2013.01); *B01D 2255/1023* (2013.01); *B01D 2255/20707* (2013.01); *B01D 2255/20723* (2013.01); *B01D 2257/40* (2013.01); *B01D 2257/708* (2013.01); *B01D 2258/025* (2013.01); *B01D 2259/804* (2013.01)
(58) Field of Classification Search
CPC .......... B01D 2258/025; B01D 2257/40; B01D 2259/804; B01D 2255/20707; B01D 2255/20723; B01D 2255/1023; B01D 2257/708; B01D 53/8668; B01D 53/8621; B01J 23/6482
See application file for complete search history.

(56) References Cited

U.S. PATENT DOCUMENTS

| | | | |
|---|---|---|---|
| 3,409,579 A | 11/1968 | Robins | |
| 4,472,246 A | 9/1984 | Stamerjohn et al. | |
| 4,543,163 A | 9/1985 | Stamerjohn et al. | |
| 7,348,288 B1 * | 3/2008 | Kittrell | B01D 53/8662 502/102 |
| 10,105,682 B2 | 10/2018 | Castellino et al. | |
| 2017/0341022 A1 * | 11/2017 | Andersen | B01D 53/8637 |
| 2018/0250665 A1 | 9/2018 | Castellino et al. | |

FOREIGN PATENT DOCUMENTS

| | | | |
|---|---|---|---|
| CN | 105457489 A | 4/2016 | |
| DE | 3742449 A1 | 6/1989 | |
| DE | 4225436 C1 | 11/1993 | |
| EP | 0583327 A1 | 2/1994 | |
| GB | 1269203 | 4/1972 | |
| KR | 2001 017 297 A * | 3/2001 | ......... B01D 53/8628 |
| KR | 101634649 B1 * | 6/2016 | ......... B01D 53/8625 |
| WO | WO 2018 099 243 A3 * | 8/2018 | ............. B01D 53/56 |

OTHER PUBLICATIONS

Tiedje, N. et al., Emission of Organic Compounds from Mould and Core Binders Used for Casting Iron, Aluminum and Bronze in Sand Moulds, Journal of Environmental and Health Part A, 2010, pp. 1866-1876, 45.

* cited by examiner

*Primary Examiner* — Timothy C Vanoy
(74) *Attorney, Agent, or Firm* — Standley Law Group LLP

(57) ABSTRACT

The present invention relates to a method and a system for the treatment of exhaust gas from industrial processes comprising at least the following consecutive steps: a) passing an exhaust gas comprising volatile organic compounds (VOCs) and/or amines through a catalytic zone at elevated temperatures, said catalytic zone comprises a deNO$_x$-catalyst and an oxidation catalyst thereby providing a first treated gas stream, and b) subjecting the first treated gas stream to ultraviolet radiation in order cause photooxidation.

26 Claims, 2 Drawing Sheets

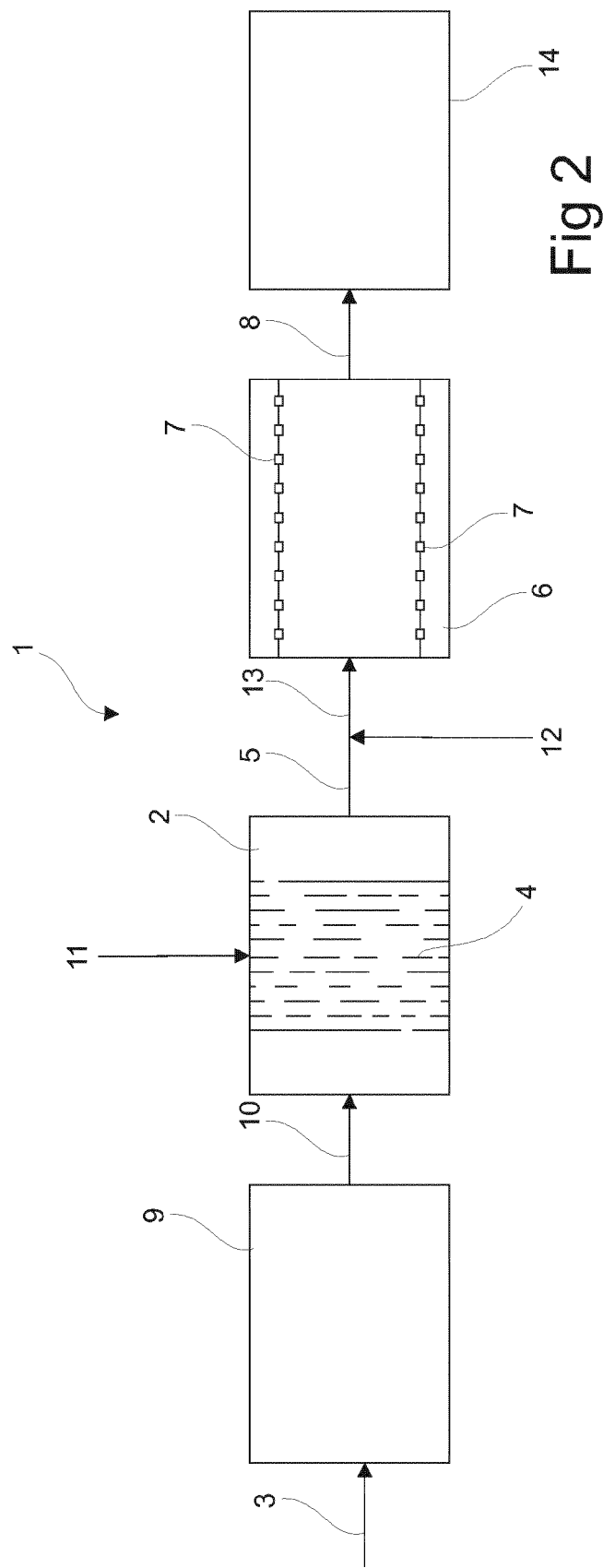

METHOD AND SYSTEM FOR TREATING FOUNDRY PROCESS EXHAUST GAS

Figure 1:
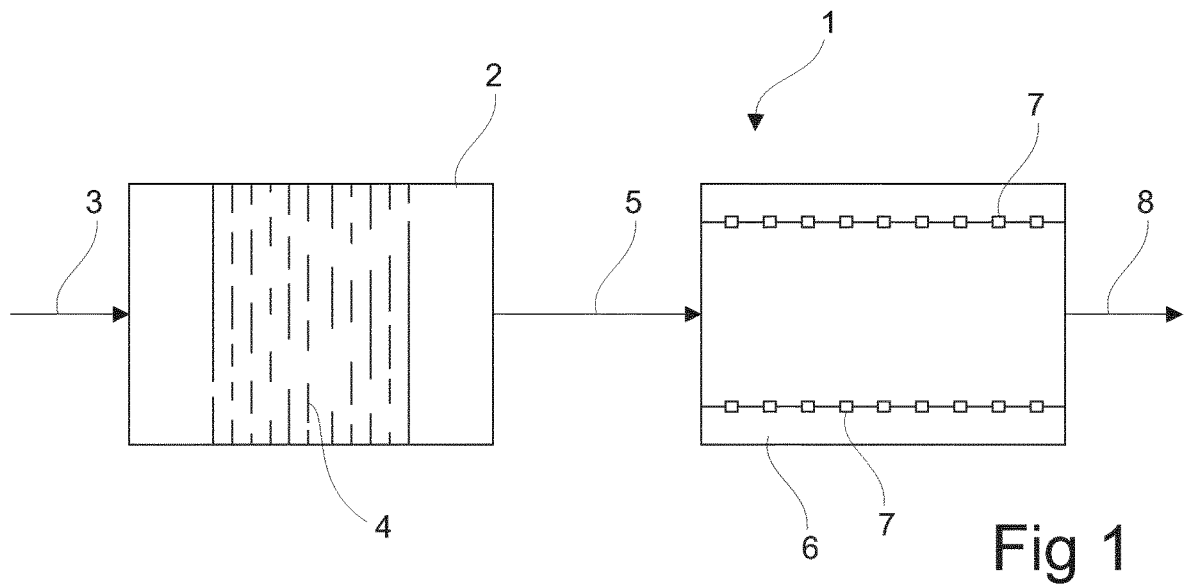

The present invention provides a method and a system for the treatment of exhaust gas from industrial processes comprising at least the following consecutive steps:
a) passing an exhaust gas comprising volatile organic compounds (VOCs) and/or amines through a catalytic zone, said catalytic zone comprises a deNO$_x$-catalyst and an oxidation catalyst thereby providing a first treated gas stream, and
b) subjecting the first treated gas stream to ultraviolet radiation in order cause photooxidation.

BACKGROUND ART

Foundries melt ferrous and non-ferrous metals and alloys and reshape them into products at or near their finished shape through the pouring and solidification of the molten metal or alloy into a mold. The foundry industry is a differentiated and diverse industry. Foundries, involved in metal castings from both ferrous and nonferrous alloys, play a significant role in the generation of VOCs and hazardous air pollutants (HAPs).

In the metal casting industry air pollution involve various emission sources such as for example the curing of castings such as during the cold-box process, the recycling of sand, the decomposition of binders by the hot metal poured into a form and others).

As examples of emissions in foundries can be mentioned mineral dusts, acidifying compounds, products of incomplete combustion, inorganic substances, volatile organic carbons (VOCs) including partially oxidised hydrocarbons, aromatic hydrocarbons such as BTEX (benzene, toluene, ethylbenzene and xylene) and other odorous substances e.g. tertiary amines, from mould production, casting, cooling and knocking out.

A general overview of the inputs and outputs of the foundry process is available from the "Reference Document on Best Available Techniques in the Smitheries and Foundries Industry" established by the European Commission in May 2005.

An overview focusing on potential pollution associated with mold and core production is provided in N. Tiedje et al.: "Emission of organic compounds from mould and core binders used for casting iron, aluminium and bronze in sand moulds", J Environ Sci Health A Tax Hazard Subst Environ Eng. 2010 December; 45(14):1866-1876.

In some foundry processes, e.g. the cold-box process, the binder comprising a polyol component and an isocyanate component is cured by injecting a volatile tertiary amine as a catalyst in a gaseous form into the mould/cores. The curing speed can be very high, which allows high production rates to be achieved but also the tertiary amine emission needs to be under control.

Typically used tertiary amines are trimethyl amine, dimethyl ethyl amine, dimethylisopropylamine, dimethyl propylamine and triethyl amine. In a cold box process the tertiary amines are passed in a gaseous form through a shaped mixture of an aggregate and the binder (U.S. Pat. No. 3,409,579). Generally phenolic formaldehyde resins are used as polyol component.

The use of the cold-box process has been constantly expanding over the last few years, and since amines have a relatively low exposure value limit, and possess a strong characteristic smell at very low concentrations it is necessary to collect and treat emissions containing amines.

While extraction may be a solution to remove the polluted exhaust gas directly at the work place, the different HAP and VOC emissions still have to be removed from the exhaust gas before it can be safely emitted into the surroundings. Traditionally, amines and VOCs have been removed from foundry exhaust gas using different and individual exhaust air clearing technologies, however since the exhaust gas and accordingly the content of the hazardous pollutant differ depending on the respective foundry process, gas treatment systems used in the foundries are often complex, large and accordingly expensive both to use, manufacture and install.

A known method are biofilters that traditionally have been applied for the removal of odorous gases, which mainly consist of amines from the exhaust-gas from coldbox coremaking processes and for the removal of VOCs (e.g. BTEX) from casting shop exhaust gases. The good performance of the filter depends on the balance between the supply of nutrient (compounds for abatement/decomposition) and the number of microorganisms. Biofiltration is based on the ability of microbes living in a fibre-peat filter bed to oxygenate malodorous gases and convert them into odourless compounds. The odorous compounds are adsorbed in the water phase and are decomposed by micro-organisms living on the filter material. However, there are a number of problems associated with biofilters such that the organisms are often very specific with regard to the substrates and are not for multipurpose use, populations may be poisoned, or the biomass may accumulate and the filters may be clogged.

Amines and VOCs can also be removed from the exhaust gas using thermal postcombustion, where the amines and VOCs are burnt. In small foundries with discontinuous production as for example the cold box method, this process is generally not controlled effectively as this among others requires that an afterburner chamber is correctly designed, that the temperature in said chamber is at least 800° C., and that the minimum dwell time of the exhaust gas in said chamber is at least 2 seconds. Accordingly, energy consumption is high and the process is therefore expensive to operate.

A very common process is the chemical absorption (scrubbing) amines contained in the exhaust air. For instance, amines are strong bases, and react with sulphuric or phosphoric acid. It is essential to work in a pH-range below pH 3 to avoid amine emissions. As a consequence, the scrubbing solution is replaced from time to time to remove concentrated salts, which subsequently require disposal as a hazardous waste. It is technically possible to process the scrubbing solution to reclaim the amine for re-use, however, the process if often expensive and time consuming.

U.S. Pat. Nos. 4,543,163 and 4,472,246 describe a process for recovery of amines from amine-containing spent acid stripping liquor. The feedstock for the process is an acid scrub liquor used to scrub amine from a vapor stream thereof which was used in a cold-box molding process in the foundry industry or in the cure of vapor permeation curable coatings in the coatings industry.

Thus, even though there presently exist a number of different technologies aiming at treating an exhaust gas from a foundry, these solutions all require large amounts of energy, are very complicated to control and maintain, and are expensive and time consuming to use.

Object of the Present Invention

Accordingly, there remains a demand for improved systems for the removal of VOCs and/or amines in a foundry exhaust gas whilst offering both a reduction in energy in order to provide a substantial complete removal of amines and/or VOC, and a decreased complexity with regards to initiation and control of the removal process.

It is therefore a first aspect of the present invention to provide an exhaust gas treatment method and system arranged for removing amines and/or VOCs, including PAH's (polycyclic aromatic hydrocarbons such as naphthalene naphtalenes) and BETX (aromatic hydrocarbons such as benzene, toluene, ethylbenzene and xylenes) in a fast and energy efficient manner.

It is a second aspect of the present invention to provide an exhaust gas treatment method and system having a compact structure, and in which the pressure drops over the system is reduced.

It is a third aspect of the present invention to provide an exhaust gas treatment method and system which does not require expensive oxidizing agents such as hydrogen peroxide or peroxyacids, thereby reducing both costs and space for storage facilities.

It is a fourth aspect of the present invention to provide an exhaust gas treatment method and system arranged for removing high concentrations of amines and/or VOCs from an exhaust gas at a relatively low temperature, It is a fifth aspect of the present invention to provide an exhaust gas treatment method and system for efficiently removing high concentrations of amines and/or VOCs in a gas discharged from a foundry, without using scrubbing solutions, biofiltration, and the like.

It is a sixth aspect of the present invention to provide an exhaust gas treatment method and system that is inexpensive to manufacture and is simple and reliable to use.

SUMMARY OF THE INVENTION

The novel and unique features whereby these and further aspects are achieved according to the present invention is by providing an exhaust gas treatment method for treating exhaust gases collected from at least one foundry process, said method comprises the consecutive steps of:
   passing an exhaust gas comprising VOCs and/or amines through a catalytic zone, said catalyst zone comprises a deNO$_x$-catalyst and an oxidation catalyst thereby providing a first treated gas stream, and
   subjecting the first treated gas stream to a photooxidation process thereby providing a second treated gas stream.

High amounts of amines are known to negatively affect the photooxidation of VOCs, and the method according to the invention is therefore unique in that the exhaust gas is first passed over a catalytic zone, arranged for providing a substantially complete removal of the amines in said exhaust gas, before the thereby obtained gas stream (first treated gas stream) is subjected to a photooxidation process in which the VOCs are removed.

Even though a significant portion of the VOCs also will be removed in the catalytic zone, it is the "pre-treatment" of the exhaust gas in the catalytic zone, where the amines are predominantly removed, that ensures that the subsequent photooxidation process works optimally, and ensures that the VOCs can be substantially completely removed.

The method according to the invention thereby provides a very simplified exhaust gas treatment method for treating exhaust gases collected from at least one foundry process.

Even though the method according to the invention provides a unique advantage when the exhaust gas comprises both amines and VOCs, the method can also be used when the exhaust gas only comprises one of amines or VOCs.

According to one embodiment the process further comprises passing the first treated gas stream through a particle filter and/or a scrubber before the first treated gas stream is subjected to the photooxidation process.

In a preferred embodiment the amines present in the exhaust gas comprise a tertiary amine, in particular dimethyl-N-ethyl amine, dimethyl-N-isopropylamine, dimethyl-N-propylamine and/or triethyl amine. The catalytic zone is preferably arranged to facilitate reactions involving atmospheric oxygen or oxygen present in the exhaust gas where this oxygen is the oxidant. By bringing an amine-containing exhaust gas into contact with the surface of the catalysts in the catalytic zone, the amines will be subjected to an oxidative decomposition, e.g. by directly oxidizing the amines to organic acids, whereby the amines effectively will be removed from the gas stream. The resultant organic acids (VOCs) will then be removed in the subsequent photooxidation step.

Even though amines are subject to degradation by contact with free oxygen, catalytic conversion of amines has not been used for treating exhaust gases containing high concentrations of amines, such as exhaust gases collected from foundries, e.g. from cold-box processes. However, the inventors have surprisingly discovered that by using a combination of a deNO$_x$-catalyst and an oxidation catalyst a unique and synergistic effect is provided in which the amines can be substantially completely removed from an exhaust gas, an effect which is not observed when the exhaust gas only passes over one of said catalysts. It is accordingly the combination of the at least two catalysts, i.e. the deNO$_x$-catalyst and the oxidation catalyst which ensures the substantial complete removal of the amines from the exhaust gas.

The use of the catalyst zone with at least a deNO$_x$-catalyst and an oxidation catalyst further has the advantage that hydrocarbons (VOCs) present in the exhaust gas, also will be oxidised, and accordingly at least to some extend be removed from the gas stream.

DETAILED DESCRIPTION OF THE INVENTION

The exhaust gas treatment system or the process comprises:
   a catalytic zone in which an exhaust gas comprising VOCs and/or amines is passed over a catalyst unit comprising a deNO$_x$-catalyst and an oxidation catalyst, thereby providing a first treated gas stream The catalytic zone is operated a 125° C. to 400° C. In order to minimize energy input it is also possible to operate a temperature between 125° C. and 275° C., preferably between 125° C. and 250° C. If VOC elimination is in the focus operating temperatures between 300° C. and 400° C. are preferred, without adversely affecting the amine elimination. According to one preferred embodiment the operating temperature is 280° C. to 380° C.

The deNO$_x$-catalyst is preferably a SCR-catalyst preferably based on at least a precious metal, preferably palladium, vanadium pentoxide and preferably a titanium dioxide carrier system. For instance, palladium and vanadium pentoxide ($V_2O_5$) may be the active compounds/components, placed on a titanium dioxide ($TiO_2$) carrier system, optionally together with tungsten trioxide. The oxidation catalyst can be a conventional CO oxidation catalyst.

Both the oxidation catalyst and the SCR catalyst are preferably coated on a honeycomb or monolithic support structure. The monolithic structure will preferably have a large number of parallel channels in order to provide a large catalyst surface area while at the same time ensure a low pressure drop over said catalytic unit.

The catalyst unit may in one embodiment be arranged as separate catalytic units/layers, e.g. one, two or three SCR catalyst layers and one, two or three oxidation catalyst layers, however in order to reduce the size of the catalytic unit and still achieve a minimal pressure drop penalty, a combination of the two catalytic functionalities in a single catalyst is preferred, e.g. by providing a combined catalyst having the desired catalytic activity.

In order to minimize the oxidation of $NH_3$/tertiary amines to NOx as well as the oxidation of other undesirable compounds such as NO to $NO_2$ and $SO_2$ to $SO_3$ (if such compounds are present in the exhaust gas to be treated) it is preferred to dope the SCR catalyst with a noble metal, preferably palladium.

It is known in the art of treatment of exhaust gases from combustion systems, to "dope" commercial SCR catalysts with noble metals, e.g. platinum, or palladium in order to provide an oxidation activity of said SCR catalyst.

One preferred catalyst material for use in the system according to the present invention is the DNX® GTC-802 catalyst obtainable from Haldor Topsøe, Denmark. Said catalyst system is described in WO 2016/150465 A1 and discloses how the catalytic functionalities of an SCR catalyst and an oxidation catalyst is combined. Furthermore, in said catalyst the noble metal for the CO oxidation reaction to the standard SCR titanium carrier is added in such a way that the concentration and the distribution of noble metal (i.e. palladium, Pd, in this case) are controlled to a very uniform level. It must be stressed that said catalytic material is arranged for removing NOx and CO from combustion engines, and accordingly functions at temperatures much higher than the temperature range used in the present invention for the catalytic zone, where removal of amines are efficiently obtained.

Furthermore, oxidative decomposition of the amines also provides a continuingly purification of the catalyst. The amines are accordingly substantially completely removed from the exhaust gas stream without significantly adding to the level of contamination, which constitutes a distinct advantage when comparing with the used prior art technologies for removing amines and/or VOCs.

The inventors of the present invention have found that when the catalytic zone is operated at temperatures between 80° C. and 400° C., preferably between 120° C. and 225° C. or 125° C. and 200° C. a very effective amine removal is provided. If the temperature is raised above 225° C. the energy efficiency of the catalytic zone will be reduced.

In comparison a standard regenerative catalytic oxidizer (RCO) operates at a temperature above 400° C., thus the system according to the invention provides a very simple and effective means for reducing the energy needed to remove amines and/or VOCs from an exhaust gas.

Due to the relatively low operation temperature at the catalytic zone, it is not always required to heat the exhaust gas before it enters said zone, thereby reducing energy and cost for the treatment significantly.

However, in order to ensure that the conditions in the catalytic zone is optimal it is according to one embodiment preferred that the exhaust gas to be treated has a temperature in the optimal temperature range, i.e. between 125° C. and 200° C. before it enters the catalytic zone. The temperature of the exhaust gas to be treated will of course depend on the origin of the exhaust gas, however if said exhaust gas does not have a temperature in the optimal temperature range, i.e. between 125° C. and 200° C., it is preferred that said gas is heated before entering the catalytic zone, by passing the exhaust gas through a temperature conditioning zone placed before the catalytic zone. Said temperature conditioning zone is arranged for providing a conditioned exhaust gas, i.e. an exhaust gas having a temperature between 80° C. and 400° C., preferably between 80° C. and 225° C. or 125° C. and 200° C. According to one embodiment the temperature is between 280° C. and 380° C.

In a preferred embodiment, the exhaust gas is heated by a heater such as a gas burner or in another heating system before it is passed through the catalytic zone. The heating of the exhaust gas can be achieved in any conventional way, e.g. by a burner.

Even in situation where the exhaust gas to be treated has a temperature in the optimal temperature range, it may still be advantageously to pass the exhaust gas through a temperature conditioning zone, as this will ensure that the operation temperature in the catalytic zone is always optimal and that variations in the exhaust gas temperature will not negatively influence the treatment process.

It is preferred that the temperature of the heated exhaust gas corresponds to the specific optimal temperature, such that when the conditioned exhaust gas enters the catalytic zone, the temperature in said zone will neither be heated nor cooled.

The exhaust gas preferably passes the catalytic zone with a space velocity of for example 2000 to 4000 l/hr to ensure removing substantially 100% of the amines and between 60-90% of the VOCs from the exhaust gas at temperatures between 125° C. to 200° C. or at higher VOCs removal rates at high temperatures.

As an alternative to oxygen and/or air, ozone may be added/injected to the catalytic zone. Ozone has the advantage that it has a high oxidation potential, making it possible to shorten the retention time in the catalytic zone gas line connected to an exhaust gas line/pipe just prior to the catalyst zone.

The catalytic zone has the advantage that it will "pretreat" the exhaust gas in such a way that when said exhaust gas is subjected to the photooxidation process, the exhaust gas will preferably not contain any compounds and/or substances that can have a negative influence on the photooxidation process. In this respect the first treated gas stream, i.e. the gas stream originating from the catalytic zone may be combined with one or more additional exhaust gases which contains VOCs but only insignificant concentrations of amines, preferably below 50 mg/m$^3$ and then subjecting the combined gas stream to the photooxidation step.

This will have the obvious advantage, that a number of different exhaust gases can be treated in combination in a single photooxidation step. If one or more of said exhaust gas streams initially contained amines, said amines could be removed in individual catalytic zones, before they were combined, and exhaust gasses containing only small amine concentrations can be directly subjected to the photooxidation step.

In the photooxidation step the VOCs e.g. remaining from the catalyst zone or added via an additional exhaust gas, including, but not limited to, organic acids, alcohols, and aldehydes can be treated by the photooxidation process.

Even though a number of different VOCs removing techniques are known, and could be used for further treating the first treated gas stream, the use of a photooxidation process, i.e. a combination of UV, e.g. at 254 nm, and ozone $(O_3)$ is preferred, where the ozone $(O_3)$ is preferably produced by the UV-bulbs, e.g. at a wavelength of 185 nm, for removing the VOCs from said gas stream.

The advantages of photooxidation are numerous. First of all, photooxidation is a destruction process wherein the resultant products are carbon dioxide, partially oxidized organic compounds, particles, and water. Thus, the second treated gas stream which is originating from the photooxidation step, may be directly and safely emitted into the surroundings.

In combination with natural oxygen, UV light creates highly reactive radicals and ozone, which oxidizes the VOCs (including pollutants such as odours, solvents etc.).

Secondly, UV-light is an energy-saving and environmentally-friendly solution and ultraviolet radiation is powerful enough to break many covalent bonds. Alone it can degrade, and/or initiate degradation of PCBs, dioxins, polyaromatic compounds, and BTEX.

Finally, ozone which is used as an oxidant in the process is a potent oxidant, and since ozone can be generated on site (using UV-lamps) and used immediately, no storage area is required for the oxidant. It is accordingly preferred that in the photo-oxidation process the first treated gas stream passes a photooxidation zone wherein a number of UV-lamps is installed. Even though ozone may be produced in an ozone generator and added directly to the photooxidation, it is preferred that the UV-lamps is arranged for operating (also) in an UV-spectrum which produces ozone, i.e. in a UV-spectrum of about 185 nm. UV light further has the effect that it enhances the oxidation process. Preferably at the same time UV light having a wavelength of about 254 nm is used.

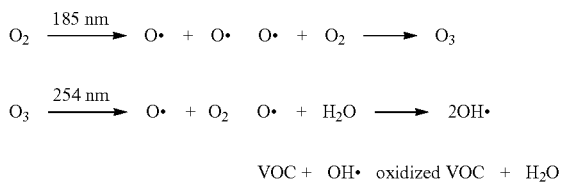

In order to ensure that the UV-lamps operate at highest efficiency, i.e. generates OH-radicals, a water spray system may be installed in said photooxidation zone to increase the relative humidity and/or absolute water content of the first treated gas stream to at least above 90%. Alternatively, the relative humidity of the first treated gas stream may be raised to at least above 90% before said gas stream enters the photooxidation zone.

Thus, the photooxidation process neither requires chemicals nor high temperatures. The operating temperature of the UV-bulbs (at the out surface) is preferably between 80° C. and 120° C.

For this purpose, the gas stream is preferably cooled to a temperature of below 100° C. or 80° C. and below before it enters the photooxidation zone for the UV treatment.

The inventors of the present invention have shown that by passing the first treated gas stream into the photooxidation zone up to 99% of the remaining concentrations of VOCs can be efficiently removed.

According to a further embodiment of the invention the process further comprises passing the first treated gas stream and optionally any additional gas stream through a particle filter and/or a scrubber before the first treated gas stream and optionally any additional gas stream is subjected to the photooxidation process. In such situation the particle filter and/or the humidifier is installed upstream of the UV treatment.

The particle filter is in particular used to filter out particles with a diameter that are large enough to absorb and/or scatter the UV light used in the UV treatment zone and/or to remove particles that cause chemical or physical damage to the UV treatment system and or negatively affect the UV treatment. Suitable particle filters are (dry and wet) electrostatic precipitators, fabric filters, ceramic filters, cartridge filters, demisters or solid filters (e.g. coal, zeolite). However, the use of other particle filter types such as cyclones or condensers is not excluded. The filters are preferably equipped with a self-cleaning system.

The scrubber may be a humidifier and is used to humidify the gas stream (to increase UV performance) and/or to remove particulate components (pollutants, particles . . . ) from the gas stream and to condition the air for the UV treatment. Water is preferably used as the medium in the humidifier. The structure of the humidifier is preferably without packing, but can also be designed with packing. For humidification, the medium is preferably sprayed into the gas stream via nozzles with or without an atomization aid (e.g. compressed air).

The particle filter and/or a humidifier may also be used to cool the gas stream to a temperature of 80° C. and below before the gas stream is subjected to the UV treatment.

According to a further embodiment of the invention the gas stream exiting the photooxidation zone may be transferred into an electrostatic precipitation zone to remove particles from the gas stream before the gas stream is released into the environment. Particles are charged and moved through an electric field towards a collector plate. Precipitation of particles with a diameter of greater 0.3 μm has an efficiency of greater 99%.

The present invention also relates to an exhaust gas treatment system arranged for performing the method described above.

"Foundry process" means each process that results in the production of a casted part (metal or other material). However, foundry processes also include process steps prior to and past the actual casting step such as for example core and form production, storage of cores and forms, curing of cores and forms, sand processing including sand recycling, model part finishing or cleaning of the casted parts. Further to exhaust gases collected from at least one foundry process, the method of the present invention can also be used for exhaust gases collected from at least one process of the hot metal processing industry. Processes from the "hot metal processing industry" means each and any process that involves the handling of hot metal or uses or generates heat to process metal (for example: welding, foundry or casting processes, hot metal purification, metal production, hot metal forming, forging, and hot metal machining.

In a preferred embodiment according to the present invention the exhaust gas treatment system according to the invention is arranged for being retrofitted into existing exhaust systems at the relevant work stations in the foundries, thereby reducing cost for expensive installation of new equipment.

The invention will be explained in greater detail below, describing only exemplary embodiments of the exhaust gas treatment system and method with reference to the drawing, in which FIG. 1 shows schematically a first embodiment of an exhaust gas treatment system according to the present invention, and FIG. 2 shows schematically a second embodiment of an exhaust gas treatment system according to the present invention.

The invention will be described below with the assumption that the exhaust gas is collected from a cold box process and comprises both amines and VOCs. However, these assumptions are not to be construed as limiting, as the exhaust gas could be collected from another foundry process or only comprise one of VOCs or amines.

FIG. 1 shows a first simplified embodiment of an exhaust gas treatment system 1 according to the invention. Said system comprises a catalytic zone 2 in which an exhaust gas 3 comprising VOCs and amines is passed over a catalyst unit 4 comprising a $deNO_x$-catalyst and an oxidation catalyst. The gas exiting said catalytic zone it a first treated gas stream 5, which then is passed onto a photooxidation zone 6, arranged after the catalytic zone, and in which the first treated gas stream is subjected to a photooxidation step.

In the photooxidation zone a number of UV-lamps 7, arranged for operating in an UV-spectrum which produces ozone, are installed.

The system and method according to the invention is unique in that when the exhaust gas 3 is passed over the catalytic zone 2, the amines present in said exhaust gas is substantially completely removed. Thus, the concentration of amines in the first treated gas stream 5, has no or only a very low concentration of amines. When said first treated gas stream 5 then enters the photooxidation process the amines originally present in the exhaust gas cannot negatively influence the performance of the photooxidation step, thereby ensuring that substantially all VOCs are removed in the photooxidation zone 6.

Since the catalyst unit 4 comprising a $deNO_x$-catalyst and an oxidation catalyst a significant portion of the VOCs in the exhaust gas 3, also will be removed in the catalytic zone. However, the "pre-treatment" of the exhaust gas in the catalytic zone in which the amines are removed, ensures that the subsequent photooxidation process works optimally.

Since photooxidation is a destruction process wherein the resultant products are carbon dioxide, partially oxidized organic compounds, particles and water, the second treated gas stream 8 originating from the photooxidation step, may be directly emitted into the environment.

The method and system according to the present invention thereby provides a very simplified exhaust gas treatment method and system for treating exhaust gases collected from at least one foundry process, a system having a compact structure, and easily can be added to existing workplaces in a foundry. The system and method further have the advantage that the pressure drop over the system is small and that said system uses much less energy for the removal process compared to the traditional amine/VOC removal systems and methods.

FIG. 2 shows a second embodiment of the system according to the invention. Said embodiment adds further details to the embodiment shown in FIG. 1, and for like parts the same reference numbers is used.

In this embodiment the exhaust gas 3 passes through a temperature conditioning zone 9 before it enters the catalytic zone. Said conditioning zone 9 is arranged for providing a conditioned exhaust gas 10, i.e. an exhaust gas 10 having a temperature between 80° C. and 400° C., preferably between 125 and 200° C., such that when the exhaust gas enters the catalytic zone, the conditions for oxidation and accordingly amine and VOC removal are optimal.

In order to ensure that sufficient oxidant is present in the catalytic unit, additional oxidant 11 may optionally be added to the catalytic zone 2. Said oxidant may be secondary air or oxygen. It is, however, according to one embodiment preferred that said oxidant is ozone, since it is possible to shorten the retention time in the catalytic zone and/or use smaller catalytic units due to the strong oxidation capabilities of ozone.

Said additional oxidant 11 may also be added to the exhaust gas just prior to the catalyst zone, e.g. provided in a second gas line connected to an exhaust gas line/pipe.

In order to ensure that the UV-lamps operate at highest efficiency, a water spray system (not shown) may be installed in the photooxidation zone 6 to increase the relative humidity and/or absolute water content of the first treated gas stream to at least above 90%.

The first treated gas stream 5, i.e. the gas stream originating from the catalytic zone 2 may further be combined with an additional exhaust gas 12 which contains VOCs but only insignificant concentrations of amines, thereby providing a combined gas stream 13. It is then the combined gas stream 13 which is subjected to the photooxidation process in the photooxidation zone 6.

The addition of an additional exhaust gas 12 to the first treated gas stream 5 has the advantage, that two different exhaust gases can be treated in combination in a single photooxidation zone 7. Thus, exhaust gases from foundry processes not generating amines or amines in very low concentrations, can be added to the first treated gas stream 5, and thereby reduce the overall exhaust gas treatment costs. In FIG. 2 only a single additional exhaust gas stream 12 is added to the first treated gas stream 5, however this is of course not limiting, and the number of additional exhaust gases can be chosen in dependence on other parameters, e.g. the limitations of the photooxidation zone.

Even though the residuals from the photooxidation process consist mainly of carbon dioxide and water, it may in some situations be advantageously to subject the second treated gas stream 8 for a further treatment zone 14, e.g. electrostatic precipitation or mechanical filtration, before the second treated gas stream 8 is emitted to the surroundings.

The inventors of the present invention have shown that by using the method and system according to the invention is capable of removing substantially 100% of the amines and up to 99% of the VOCs from the exhaust gas.

The invention claimed is:

1. A method for treating an exhaust gas collected from at least one foundry process, the method comprising the steps of:
   passing an exhaust gas, containing at least one of volatile organic compounds (VOCs) and amines through a catalytic zone comprising a deNOx-catalyst and an oxidation catalyst, providing a first treated gas stream; and
   subjecting the first treated gas stream to a photooxidation step, providing a second treated gas stream.

2. The method according to claim 1, wherein the deNOx-catalyst is a selective catalytic reduction (SCR) catalyst.

3. The method according to claim 2, wherein the exhaust gas passes through the catalytic zone at a temperature between 80° C. and 400° C.

4. The method according to claim 1, wherein the exhaust gas comprises a tertiary amine.

5. The method according to claim 1, wherein the step of passing the exhaust gas through the catalytic zone comprises the substep of adding ozone.

6. The method according to claim 1, wherein the first treated gas stream to be subjected to the photooxidation step further comprises at least one additional exhaust gas which was not passed to the catalytic zone, providing a combined gas stream and subjecting the combined gas stream to the photooxidation step.

7. The method according to claim 6, wherein the at least one additional exhaust gas has an amine concentration below 50 mg/m³.

8. The method according to claim 1, wherein the photooxidation step comprises simultaneously generating ultraviolet (UV) radiation and ozone.

9. The method according to claim 1, comprising the further step of raising a relative humidity of the first treated gas stream to above 90% either before and/or during the photooxidation step.

10. The method according to claim 1, wherein the exhaust gas passes through the catalytic zone at a temperature between 80° C. and 400° C.

11. The method according to claim 1, wherein the deNOx-catalyst is a selective catalytic reduction (SCR) catalyst based on at least a precious metal or vanadium pentoxide.

12. The method according to claim 1, wherein the deNOx-catalyst is a selective catalytic reduction (SCR) catalyst having a titanium dioxide carrier system.

13. The method according to claim 1, wherein the exhaust gas comprises one or more of dimethyl-N-ethylamine, dimethyl-N-isopropylamine, dimethyl-N-propylamine and/or triethyl amine.

14. The method according to claim 1, wherein the exhaust gas passes through the catalytic zone at a temperature between 125° C. and 200° C.

15. A system for treating exhaust gases collected from at least one foundry process, comprising:
a catalytic zone, comprising a catalyst unit having at least a deNOx-catalyst and an oxidation catalyst, through which an exhaust gas is passed, the exhaust gas containing at least one of: volatile organic compounds (VOCs) and amines, thereby providing a first treated gas stream; and
a photooxidation zone, arranged after the catalytic zone.

16. The system according to claim 15, wherein the deNOx-catalyst is a selective catalytic reduction (SCR) catalyst.

17. The system according to claim 16, wherein the catalytic functionalities of the SCR catalyst and the oxidation catalyst are combined in a single catalytic system.

18. The system according to claim 15, wherein the exhaust gas passing through the catalytic zone has a temperature between 80° C. and 400° C.

19. The system according to claim 15, wherein the photooxidation zone comprises a number of ultraviolet (UV)-lamps operating in an UV-spectrum at about 185 nm.

20. The system according to claim 15, wherein the amount of amines and/or VOCs from the exhaust gas collected from at least one foundry process is reduced.

21. The system according to claim 20, wherein the at least one foundry process relates at least to the production of cores and forms.

22. The system according to claim 20, wherein the at least one foundry process relates at least to the production of cores and forms and is a cold-box process.

23. The system according to claim 15, wherein the deNOx-catalyst is a selective catalytic reduction (SCR) catalyst based on at least one precious metal or vanadium pentoxide.

24. The system according to claim 15, wherein the deNOx-catalyst is a selective catalytic reduction (SCR) catalyst having a titanium dioxide carrier system.

25. The system according to claim 15, wherein the exhaust gas passing through the catalytic zone has a temperature between 125° C. and 200° C.

26. The system according to claim 15, wherein the photooxidation zone comprises a number of ultraviolet (UV)-lamps operating in an UV-spectrum at about 185 nm and at about 254 nm in order to generate ozone.

* * * * *